(12) United States Patent
Key

(10) Patent No.: US 11,400,849 B2
(45) Date of Patent: Aug. 2, 2022

(54) PORTABLE CONVEYOR SYSTEM FOR USE WITH A VEHICLE

(71) Applicant: Jason Key, Newaygo, MI (US)

(72) Inventor: Jason Key, Newaygo, MI (US)

(*) Notice: Subject to any disclaimer, the term of this patent is extended or adjusted under 35 U.S.C. 154(b) by 206 days.

(21) Appl. No.: 16/817,921

(22) Filed: Mar. 13, 2020

(65) Prior Publication Data

US 2020/0290494 A1 Sep. 17, 2020

Related U.S. Application Data

(60) Provisional application No. 62/819,116, filed on Mar. 15, 2019.

(51) Int. Cl.
| | | |
|---|---|---|
| *B60P 1/38* | (2006.01) | |
| *B60P 1/43* | (2006.01) | |
| *B65G 69/30* | (2006.01) | |
| *B65G 67/24* | (2006.01) | |
| *B65G 67/08* | (2006.01) | |

(52) U.S. Cl.
CPC ............. *B60P 1/38* (2013.01); *B60P 1/435* (2013.01); *B65G 69/30* (2013.01); *B65G 67/08* (2013.01); *B65G 67/24* (2013.01)

(58) Field of Classification Search
CPC ......... B65G 41/00; B65G 41/008; B60P 1/36; B60P 1/38; B60P 1/435
USPC ........................................ 198/312, 313, 315
See application file for complete search history.

(56) References Cited

U.S. PATENT DOCUMENTS

| | | | | |
|---|---|---|---|---|
| 1,770,640 A | * | 7/1930 | Beasley | B60P 1/36 414/438 |
| 2,419,824 A | * | 4/1947 | Davis | B60P 1/36 414/489 |
| 3,122,251 A | * | 2/1964 | Gardipee | B60P 1/36 414/489 |
| 3,563,364 A | * | 2/1971 | Arndt | B65G 41/002 198/316.1 |
| 3,581,874 A | * | 6/1971 | Keith | B65G 41/002 198/317 |
| 3,863,783 A | * | 2/1975 | Spellman, Jr. | B28C 5/4255 414/523 |
| 4,270,881 A | * | 6/1981 | Baker | B65G 41/008 198/823 |
| 5,325,953 A | * | 7/1994 | Doster | B65G 43/08 198/304 |
| 5,915,911 A | * | 6/1999 | Hodgetts | B60P 1/38 414/527 |

(Continued)

*Primary Examiner* — Mark C Hageman
(74) *Attorney, Agent, or Firm* — Brennan, Manna & Diamond, LLC

(57) ABSTRACT

A portable and articulating conveyor belt device for use with a vehicle having a power supply, wherein the vehicle's power supply powers the conveyor belt device. The conveyor belt device is removably attachable to a trailer hitch assembly on a vehicle, and enables a user to quickly and safely load articles onto/off of the vehicle via a conveyor belt. The conveyor belt device is preferably controlled via a remote control and controls the position of the device, as well as the direction and speed of the conveyor belt. The support frame of the conveyor belt device is comprised of a plurality of repositionable, interlocking and pivoting support frame members that enable the device to be arranged in a variety of configurations to suit user need and/or preference.

19 Claims, 5 Drawing Sheets

(56) References Cited

U.S. PATENT DOCUMENTS

| | | | | |
|---|---|---|---|---|
| 6,845,859 | B2* | 1/2005 | Grundl | E01C 19/48 |
| | | | | 198/302 |
| 7,374,389 | B2* | 5/2008 | Wilson | B60P 1/36 |
| | | | | 198/313 |
| 7,540,700 | B2* | 6/2009 | Hook | A01D 90/10 |
| | | | | 414/503 |
| 7,581,918 | B2* | 9/2009 | Jordan | E01F 9/70 |
| | | | | 198/315 |
| 7,891,479 | B2* | 2/2011 | Evangelista | B65G 41/008 |
| | | | | 198/312 |
| 8,408,857 | B2* | 4/2013 | Kelderman | A01D 87/122 |
| | | | | 414/111 |
| 8,931,997 | B2* | 1/2015 | Kelderman | B60P 1/36 |
| | | | | 414/482 |
| 9,333,892 | B2* | 5/2016 | Johnson | B60P 1/36 |
| 10,150,660 | B2* | 12/2018 | Koppelaar | E01C 19/20 |
| 11,097,902 | B2* | 8/2021 | Eberts | B65G 21/12 |
| 2005/0226706 | A1* | 10/2005 | Thomas | B60P 1/38 |
| | | | | 414/467 |

\* cited by examiner

PORTABLE CONVEYOR SYSTEM FOR USE WITH A VEHICLE

CROSS-REFERENCE TO RELATED APPLICATION

The present application claims priority to, and the benefit of, U.S. Provisional Application No. 62/819,116, which was filed on Mar. 15, 2019 and is incorporated herein by reference in its entirety.

BACKGROUND

The present invention relates generally to a portable and articulating conveyor system for use with a vehicle used for hauling or transporting goods, such as a pick-up. More specifically, the present invention relates to a tailgate conveyor belt system that attaches to a pickup truck/vehicle tow-hitch receiver, and that is interconnected and powered by the vehicle's existing power supply. Accordingly, the present specification makes specific reference thereto. However, it is to be appreciated that aspects of the present invention are also equally amenable to other like applications, devices and methods of manufacture.

Vehicles, such as pick-up trucks and the like, are frequently used by individuals to move items from one place to another. In order to do so, the individual must first load the item into the vehicle (e.g., a truck bed), transport the item to its destination, and then unload the item from the vehicle. Many vehicles including pickup trucks have a bed height that is several feet off the ground, meaning that the individual must first lift the item to be transported into the bed of the truck and then, once the item has been transported to the desired location, remove the item from the bed of the truck. Unfortunately, the process of loading and unloading transported items poses a significant challenge to an individual who wishes to transport any number of items via a pickup truck or other vehicle.

For example, an individual may not be able to load an item into a pickup truck or other vehicle if said item is exceptionally heavy, or exceeds the weight in which an individual can comfortable lift several feet off of the ground without straining themselves. This inability to lift said items could be due to a number of factors such as old age, weakened strength due to injury, the size or shape of the item to be lifted, or a general lack of strength by the individual. Additionally, an individual that must repeatedly load and unload a large number of items may become fatigued over time, which could result in the inability of the individual to load/unload all of the items, or the individual dropping the item because of fatigue and damaging the same.

Therefore, there exists a long felt need in the art for a device that can be used to aid an individual in loading and unloading items into a pickup truck bed or other vehicle. More specifically, there is a long felt need in the art for a conveyor type device that is both portable and articulating, and that does not require the individual to have to pick the item being transported more than a few inches off the ground. There is also a long felt need in the art for a device that can be powered by the existing power supply associated the vehicle that it is being used in conjunction with, and that is removably attached to said vehicle for secure handling. Finally, there is a long felt need for a portable conveyor belt system that is adaptable to a wide range of differing vehicle heights/dock heights, and that is both safe and easy to use.

The present invention, in one exemplary embodiment, is a portable and articulating conveyor belt system that is removably attachable to a tow-hitch receiver of a vehicle via a vehicle hitch connector, and that is in electrical communication with the vehicle's power supply via, for example, the vehicle's taillight or trailer hitch wiring system. More specifically, the angle of the portable conveyor belt device may be adjusted to suit user need and/or preference via a hydraulic arm and a plurality of articulating points that can be controlled by a user via a remote control device, or a mobile phone (or other smart device) application. Further, the movement of the conveyor belt is bi-directional to facilitate easy loading and/or unloading of a transported article or item, and is powered by an integrated electric motor that is, in turn, powered by the vehicle's own power supply. Additionally, the portable and articulating conveyor belt system is also repositionable between a stowed position and a plurality of different operational positions, thereby increasing the overall flexibility and usefulness of the device.

In this manner, the portable and articulating conveyor system of the present invention accomplishes all of the forgoing objectives, thereby improving the ability of a user to successfully load and unload any item, or a plurality of items, into a vehicle, such as a pick-up truck bed, with minimal effort. The portable and articulating conveyor belt system of the present invention also relies on the existing power supply of the vehicle, thereby reducing manufacturing costs (e.g., by eliminating the need to incorporate a standalone power source) and improving overall efficiencies. Finally, the portable and articulating conveyor system of the present invention is capable of being remotely operated by a user via a remote control or smart device, and is also repositionable between a stowed position and a plurality of different operational positions to suit user need and/or preference.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a portable and articulating conveyor belt system or device for use with a vehicle having a power supply, such as a pickup truck, wherein the vehicle's power supply powers the conveyor belt device. More specifically, the portable conveyor belt device is preferably comprised of a support frame; a conveyor frame; a conveyor belt assembly; a hydraulic arm assembly; a motor; a ramp; and a remote control device. The support frame is comprised of a plurality of pivotably connected support frame members whose interaction amongst themselves and with a vehicle trailer hitch, the conveyor frame, and the hydraulic arm assembly permit the conveyor belt device of the present invention to be arranged in a multitude of different configurations to suit user need and/or preference.

Further, the conveyor frame is preferably comprised of two spaced apart and generally parallel side frame members connected to one another by at least one, and preferably two or more, cross member, and supports the conveyor belt assembly. The conveyor belt assembly is preferably comprised of a continuous and tensioned conveyor belt that operates on a pair of spaced apart and generally parallel rollers that extend between the parallel side frame members of the conveyor frame and rotate about a pin attaching them to said side frame members. The continuous conveyor belt is capable of variable speed operation in both a forward and a reverse direction, as explained more fully below.

The hydraulic arm assembly is pivotably attached to both the first frame member of the support frame on one end, and the conveyor frame on the opposite end, and is comprised of a hydraulic arm housing and a hydraulic arm that extends outwardly therefrom. The hydraulic arm assembly may be powered by the motor, and is used to reposition the conveyor frame and conveyor belt relative to first frame member of the support frame. For example, the conveyor belt and accompanying frame may be substantially parallel to the first frame member or may be at an incline in relation thereto.

The motor is preferably an electric motor, and is used to power the conveyor belt and/or the hydraulic arm assembly via one or more gears. The motor is preferably in electrical communication with the vehicle's existing power supply via a power cord that may be connected to the vehicle's taillight or trailer hitch's electrical system. Alternatively, it is also contemplated that the motor could have its own dedicated and independent power supply, such as a battery or the like.

In a preferred embodiment of the present invention, the ramp is pivotably connected to the side frame members of the conveyor frame to more easily and securely engage a surface, such as a dock or the ground. The ramp is preferably comprised of a top plate or surface that generally aligns with the top surface of the conveyor belt to ensure a smooth transition from the ramp to the conveyor belt, or vice versa, and a lip portion for engaging a dock or other surface to provide additional support to the outboard end of portable conveyor belt device.

Additionally, the remote control device can be used to control and manipulate the portable conveyor belt system, and may be battery powered or hardwired into the existing vehicle's power supply. The remote control may be in the form of a stand-alone device, or a smart device application that communicates with the portable conveyor belt system wirelessly (e.g., via Bluetooth or RFID technology, etc.). For example, the remote control device could, among other things, cause the hydraulic arm assembly to reposition the conveyor frame and conveyor belt relative to the first frame member from a parallel position to an inclined position or vice versa, and/or change speed and/or the direction of the conveyor belt.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
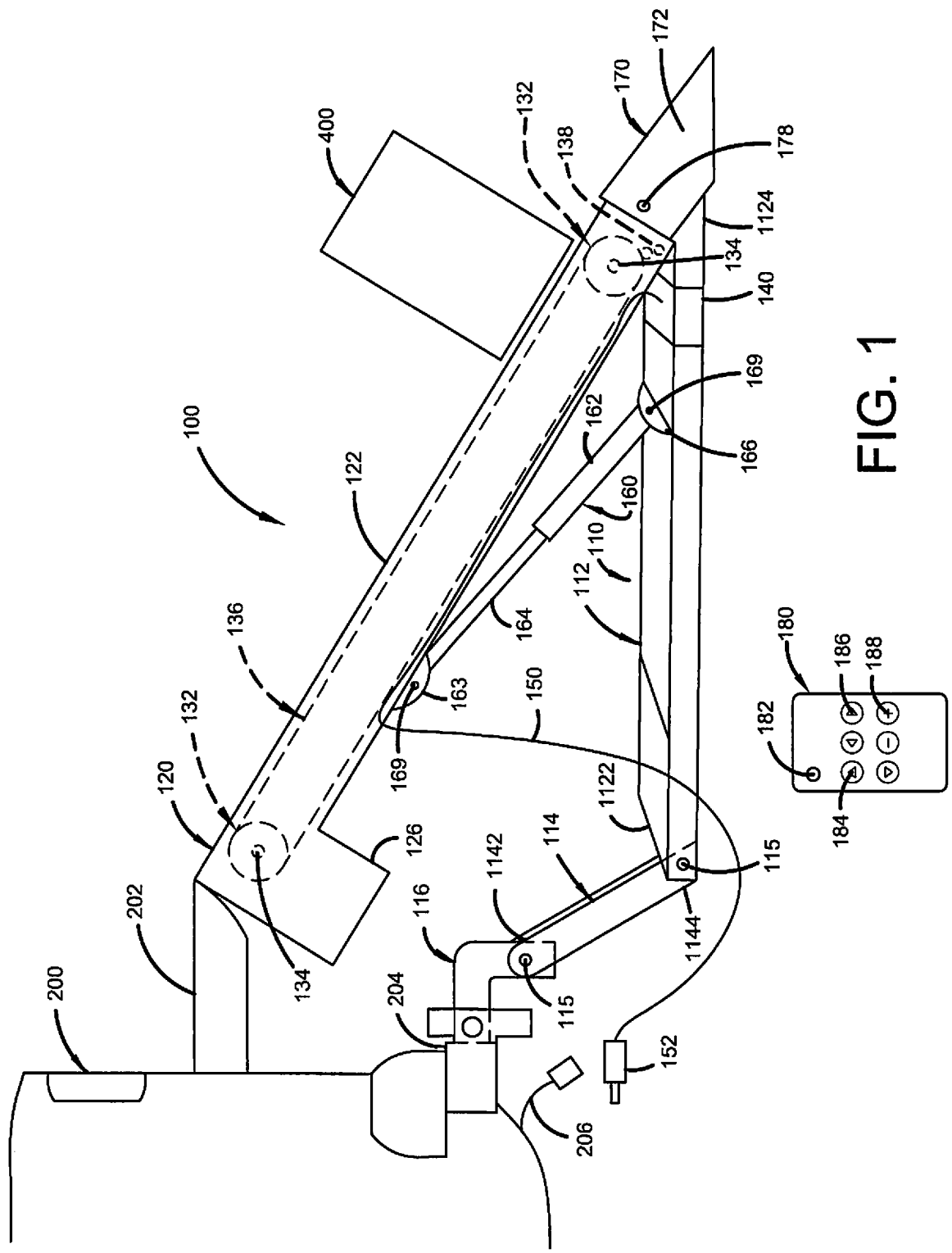
FIG. 1 illustrates a side perspective view of one embodiment of the portable conveyor device of the present invention in an operable position and being used to load a package into a vehicle via a remote control device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists in the art a long felt need for a portable tow-hitch receiver conveyor belt device that aids a user in loading/unloading any number of items into/off of a vehicle with minimal effort. There also exists in the art a long felt need for a portable conveyor device that is easily repositionable, powered by the vehicle's existing power supply, and that can easily and readily be transported along with the vehicle the device is mounted to. The portable conveyor device can be used by a variety of individuals, who may be physically unable to load any number of items into a vehicle due to physical disability or other circumstances. The device can also be used while resting on a ground surface or while suspended and resting on another raised surface, such as a loading dock. In differing embodiments of the device, the elevation and speed of the conveyor belt may be controlled by a mobile application via a Bluetooth connection, a radio frequency remote control, or the like.

Referring initially to the drawings, FIG. 1 illustrates a side perspective view of one embodiment of the portable conveyor device 100 of the present invention in an operable position and being used to load a package 400 into a vehicle 200 having a vehicle tailgate 202, a vehicle tow hitch 204 and a vehicle power supply 206 in accordance with the disclosed architecture. More specifically, the portable and articulating conveyor device 100 is preferably comprised of a support frame 110; a conveyor frame 120; a conveyor belt assembly 130; a motor 140; a power cable 150; a hydraulic arm assembly 160; a ramp 170; and a remote control device 180 for controlling the operation of the portable conveyor device 100.

Figure 2:
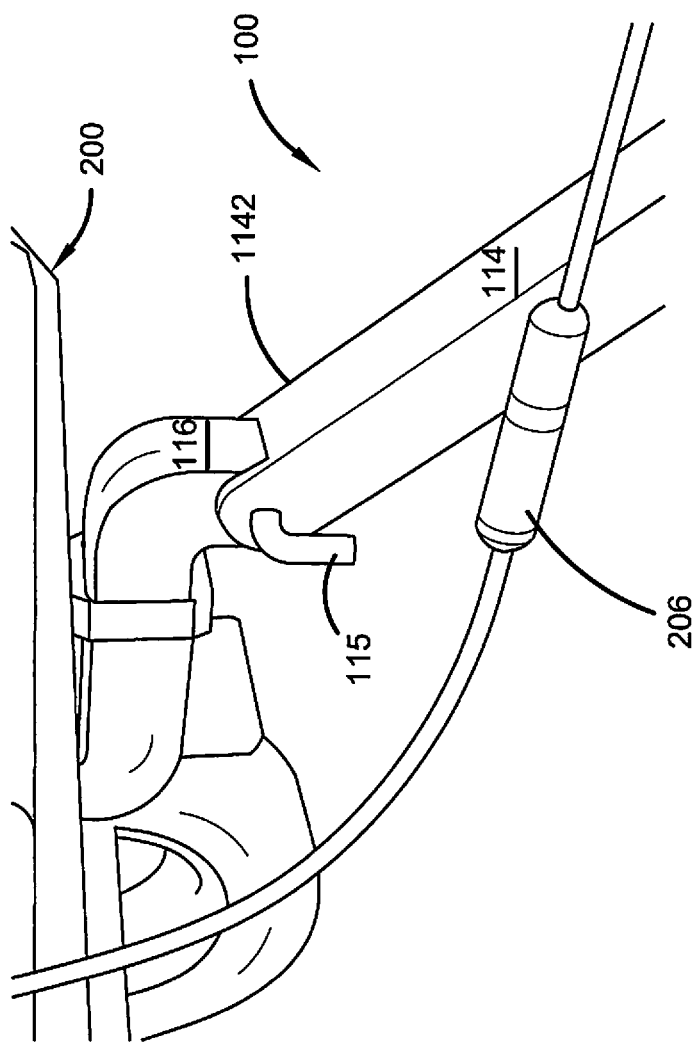
FIG. 2 illustrates a partial perspective view of one embodiment of the main support arm of the portable conveyor device of the present invention removably attached to a tow-hitch of a vehicle, and the vehicle's power supply in electrical communication with the portable conveyor device in accordance with the disclosed architecture.
Figure 4:
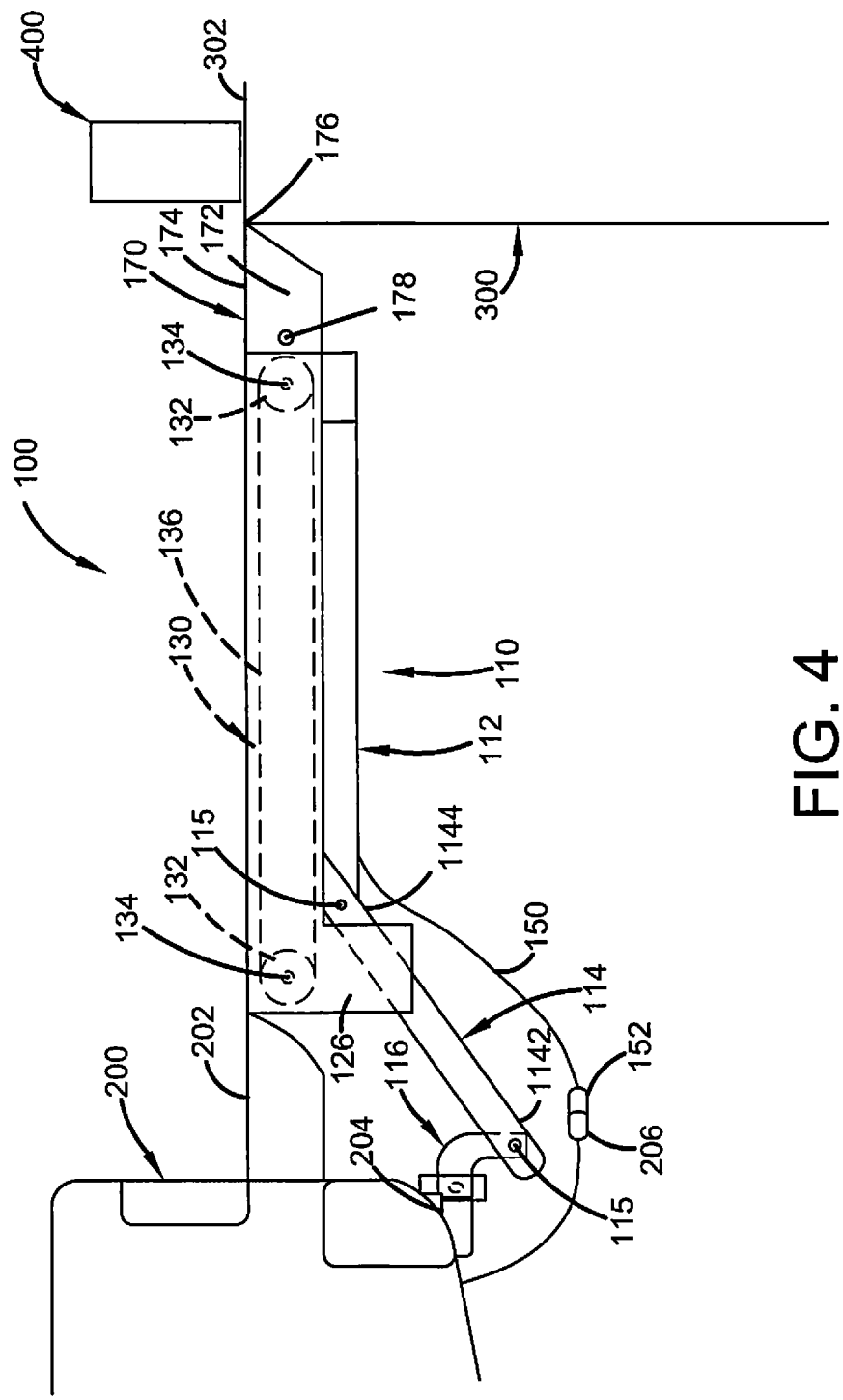
FIG. 4 illustrates a side perspective view of one embodiment of the portable conveyor device of the present invention in an operable position and being used to load a package into a vehicle from a dock in accordance with the disclosed architecture.
Figure 5:
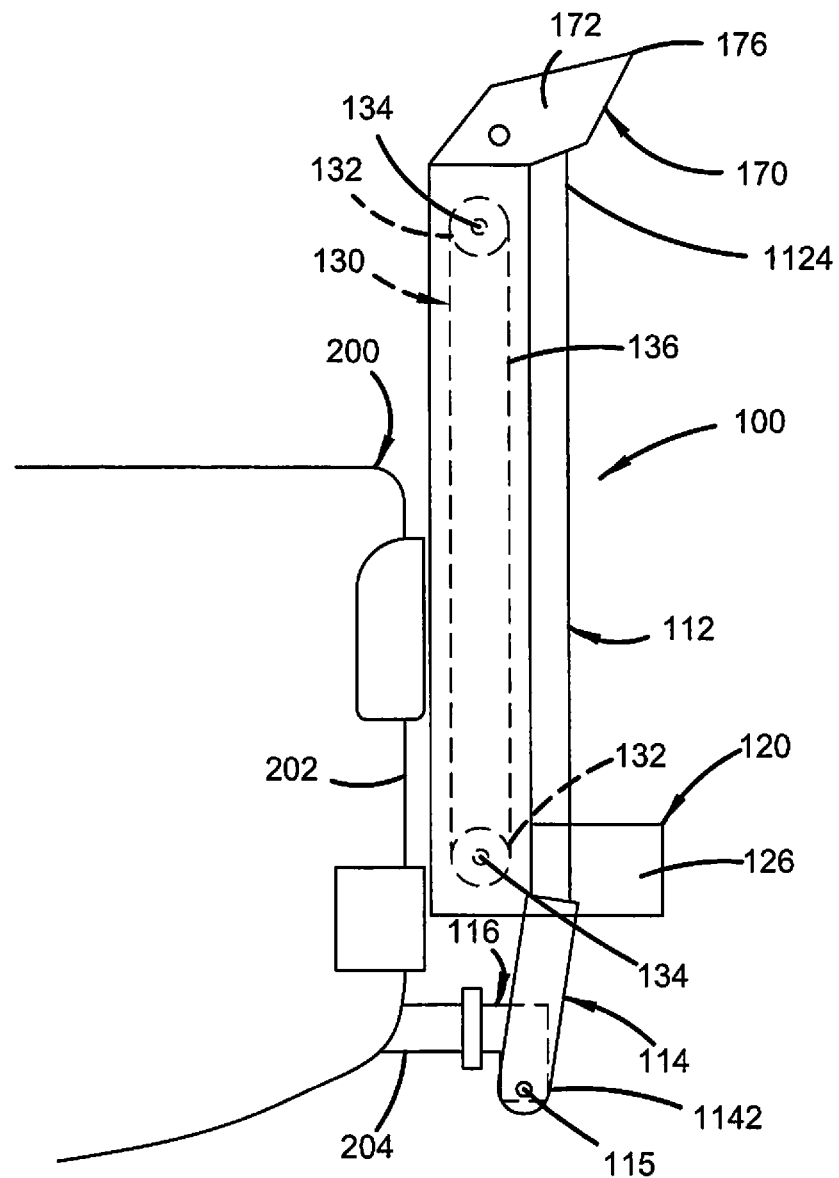
FIG. 5 illustrates a side perspective view of one embodiment of the portable conveyor device of the present invention in an stowed position and attached to a vehicle in accordance with the disclosed architecture.

As best shown in FIGS. 1, 4 and 5, support frame 110 is preferably comprised of a first frame member 112, a second frame member 114 and a third frame member or trailer hitch connector 116. Unless, otherwise stated herein, each of the components of support frame 110 is preferably comprised of steel, aluminum or other suitable and durable material, and may be painted or otherwise treated with an anti-corrosion coating to protect the same from the elements and the formation of rust. First frame member 112 is preferably in the form of an elongated tube or box channel, and is comprised of a first end 1122 and an opposing second end 1124. Likewise, second frame member 114 is preferably in the form of an elongated tube or box channel, and is comprised of an inboard end 1142 (inboard referring to the end closest to vehicle 200 when device 100 is removably attached thereto, as shown in FIG. 1) and an outboard end 1144. As best shown in FIG. 1, the first end 1122 of first arm member 112 is pivotably attached to the outboard end 1144 of second arm member 114 by a pin 115, the importance of which is explained more fully below. Similarly, and as best shown in FIGS. 1 and 2, trailer hitch connector 116 is pivotably attached to the inboard end 1142 of second arm member 114 by a pin 115, and is further removably attached, on its opposite end, to vehicle tow-hitch 204, also typically with a pin 115 passing through both the trailer hitch connector 116 and the vehicle tow-hitch 204, as is known in the art. As explained more fully below, the plurality of pivotably connected support frame members whose interaction amongst themselves, and with a vehicle tow hitch 204, the conveyor frame 120, and the hydraulic arm assembly 160, permit the conveyor belt device 100 to be arranged in a multitude of different configurations to suit user need and/or preference, or a particular application. Pins 115 may be any type of pin or locking pin commonly known in the art including, without limitation, a locking hitch pin, a combination of hitch pin and lynch pin, a cotter pin, etc.

The conveyor frame 120 supports the conveyor belt assembly 130 as explained more fully below, and is preferably comprised of two spaced apart and generally parallel side frame members 122 connected to one another by at least one, and preferably two or more, cross members 124. Unless, otherwise stated herein, each of the components of conveyor frame 120 is preferably comprised of steel, aluminum or other suitable material, and may be painted or otherwise treated with an anti-corrosion coating to protect the same from the elements and the formation of rust. Each of the side frame members 122 and cross members 124 are preferably in the form of an elongated tubular or box-shaped channel, and may be attached to one another by any means commonly known in the art, such as welds, fasteners, or the like. As best shown in FIGS. 1, 3, 4 and 5, each of side frame members 122 may further comprise a leg 126 that extends outwardly therefrom for contacting a surface, such as vehicle tailgate 202. Each of legs 126 is preferably positioned on an inboard end and underside of side frame members 122.

Conveyor belt assembly 130 is preferably comprised of a continuous and tensioned conveyor belt 136 that operates on a pair of spaced apart and generally parallel rollers 132 that extend between the parallel side frame members 122 of the conveyor frame 120 and rotate about a pin 134 attaching them to side frame members 122, as best shown in FIGS. 1, 4 and 5. Pins 134 may be any type of fastener, pin or locking pin commonly known in the art including, without limitation, a locking hitch pin, a combination of hitch pin and lynch pin, a cotter pin, etc. Further, one or more of rollers 132 may be in mechanical communication with, and rotatably powered by, one or more of gears 138, which in turn may be rotatably driven or powered by motor 140, as explained more fully below.

As best shown in FIG. 1, gears 138 are preferably positioned adjacent to motor 140 near the outboard end of conveyor belt assembly 130, and may be attached to either the first frame member 112, opposing side frame members 122, or a cross member 124. The continuous conveyor belt 136 is in tension on, and is powered by, the rotation of rollers 132, and is capable of variable speed operation in both a forward and a backward or reverse direction via remote control 180, as explained more fully below. It is to be contemplated that the conveyor belt 136 can be comprised of any durable and slip resistant material, such as rubber or the like, to prevent the package 400 from slipping off of the conveyor belt 136 while in motion.

While not specifically shown in the FIGS., it is also contemplated that conveyor frame 120 may further comprise a bottom plate that could be positioned between the conveyor belt assembly 130 and a ground surface to shield the conveyor belt assembly 130, and its various components, from dirt/debris that may be kicked upward from the ground or road while portable conveyor device 100 is being hauled by vehicle 200. The presence of the bottom plate could also help prevent the rollers 132 described above from being obstructed by a foreign object, as well as preventing an object travelling on the conveyor belt 136 from being pulled completely around/under the belt 136, which could result in damage thereto.

The hydraulic arm assembly 160 is pivotably attached to both the first frame member 112 of the support frame 110 on one end, and the conveyor frame 120 on the opposite end, and is comprised of a hydraulic arm housing 162 and a hydraulic arm 164 that extends outwardly from said hydraulic arm housing 162. More specifically, the hydraulic arm assembly 160 further comprises a first frame member mount 166 that may be fixedly attached to an outside surface of first frame member 112 (e.g., by welding, fasteners or the like) and pivotably connected to hydraulic housing 162 via a pin 169. Similarly, the hydraulic arm assembly 160 further comprises a conveyor frame mount 168 that may be fixedly attached to an outside surface of a cross member 124 of conveyor frame 120 (e.g., by welding, fasteners or the like) and pivotably connected to hydraulic arm 164 via a second pin 169, as best shown in FIG. 1. As is stated above, pins 169 may be any type of pin or locking pin commonly known in the art including, without limitation, a locking hitch pin, a combination of hitch pin and lynch pin, a cotter pin, etc.

Figure 3:
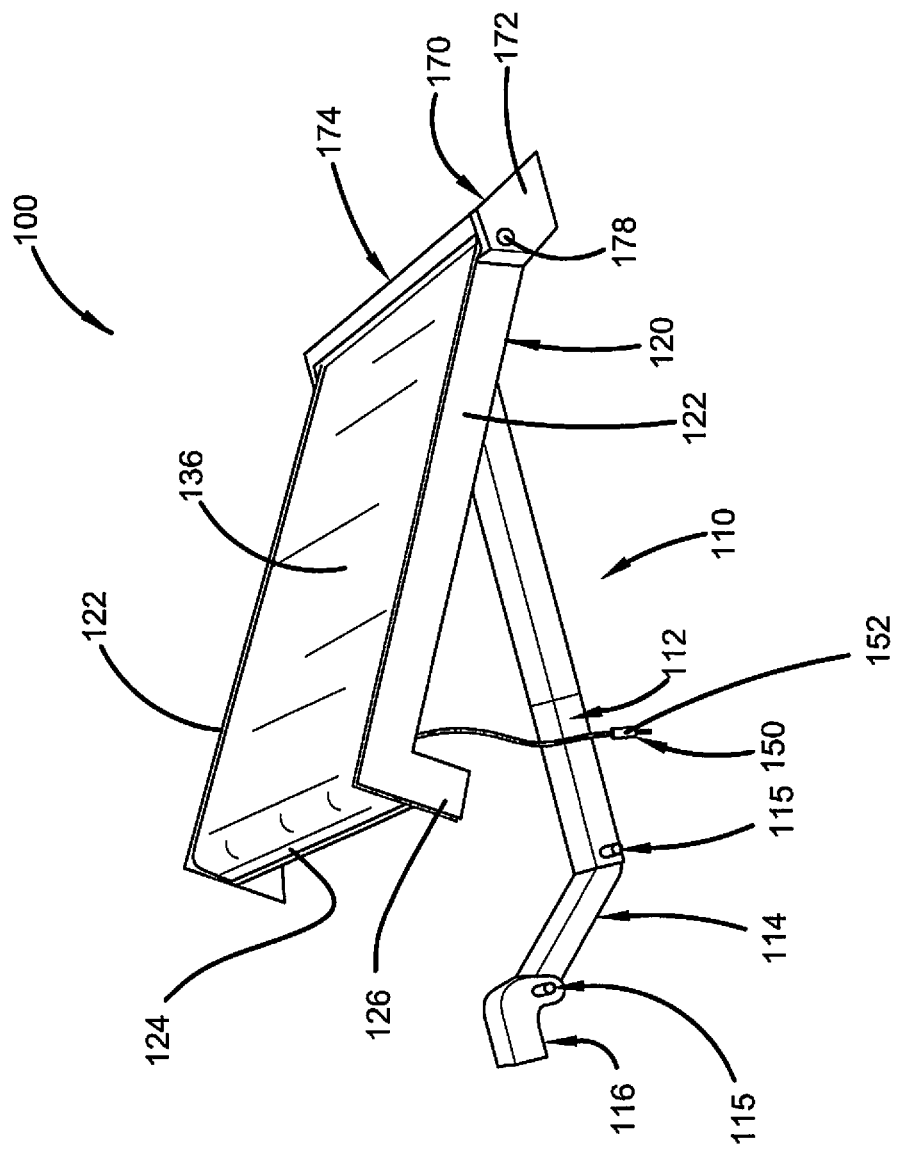
FIG. 3 illustrates a perspective view of one embodiment of the portable conveyor device of the present invention in an operable position and detached from a vehicle in accordance with the disclosed architecture.

The hydraulic arm assembly 160 may be powered by the motor 140, and is used to reposition the conveyor frame 120 and conveyor belt 136 relative to first frame member 112 of the support frame 110. For example, the conveyor belt 136 and accompanying frame conveyor 120 may be substantially parallel to the first frame member 112 as best shown in FIGS. 4 and 5, or may be at an incline in relation thereto as best shown in FIGS. 1 and 3. More specifically, as hydraulic arm assembly 160 operates to reposition conveyor frame 120 and conveyor belt 136 relative to first frame member 112, second frame member 114 may articulate or rotate about pins 115 relative to first frame member 112 and/or trailer hitch connector 116.

Motor 140 may be any commercially available electric motor for powering a device such as portable conveyor device 100, and is specifically used to power the conveyor belt 136 via rollers 132 and gears 138, and/or the hydraulic arm assembly 160 via gears 138. The motor 140 is preferably in electrical communication with the vehicle's existing power supply 206 via power cord/cable 150, thereby eliminating the need for a standalone power source and the costs associated therewith. More specifically, power cable 150 may further comprise a male or female connector 152 that corresponds to a connector for the vehicle power supply 206 that may be part of the vehicle's taillight or trailer hitch's 204 electrical system, as best shown in FIG. 1. Alternatively, it is also contemplated that the motor 140 could have its own dedicated and independent power supply, such as a battery, solar panel device or the like (not shown).

In a preferred embodiment of the present invention, the ramp 170 is pivotably connected to the side frame members 122 of the conveyor frame 120 to more easily and securely engage a surface, such as a dock 300 or the ground. More specifically, ramp 170 is preferably comprised of a pair of spaced apart side members 172 that are pivotally connected to side frame members 122 of the conveyor frame 120 via a pin 178, a top plate 174 and a lip portion 176 that extends outwardly from the top plate 174 in a direction away from portable conveyor device 100. Importantly, top plate 174 of ramp 170 generally aligns with the top surface of conveyor belt 136 to ensure a smooth transition from the ramp 170 to the conveyor belt 136, or vice versa, as best shown in FIG. 1. Additionally, the ability of ramp 170 to pivot about pin 178 enables it to sit relatively flush on most ground surfaces, such as is shown in FIG. 3. As noted above, pins 178 may be any type of pin or locking pin commonly known in the art including, without limitation, a locking hitch pin, a combination of hitch pin and lynch pin, a cotter pin, etc. Finally, lip portion 176 is also capable of engaging a surface, such as dock surface 302 as is shown in FIG. 4, to provide additional structural support for portable conveyor device 100, particularly on its outboard or cantilevered end.

Remote control device 180 can be used to control and manipulate the portable conveyor belt system 100 of the present invention, and may be battery powered or hardwired into the existing vehicle's power supply 206. Further, the remote control 180 may be in the form of a stand-alone device, or a smart device application that communicates with the portable conveyor belt system 100 wirelessly (e.g., via Bluetooth or RFID technology). As best shown in FIG. 1, the remote control device 180 is preferably comprised of a user interface comprised of a plurality of buttons including, without limitation, a power button 182 for powering the remote control 180, a raise/lower elevation button(s) 184 for articulating the conveyor belt system 100 into a desired position such as the various positions shown in the FIGS., a direction control button 186 for moving the conveyor belt 136 in a forwards or backwards direction to load/unload package 400 to/from vehicle 200, and a speed control button 188 for controlling the speed of conveyor belt 136.

Notwithstanding the forgoing, the portable conveyor device 100 of the present invention and its various structural components can be any suitable size, shape, and configuration as is known in the art without affecting the overall concept of the invention, provided that it accomplishes the above stated objectives. One of ordinary skill in the art will appreciate that the shape and size of the conveyor device 100 and its various components, as show in the FIGS. are for illustrative purposes only, and that many other shapes and sizes of the conveyor device 100 are well within the scope of the present disclosure. Although dimensions of the conveyor device 100 and its components (i.e., length, width, and height) are important design parameters for good performance, the conveyor device 100 and its components may be any shape or size that ensures optimal performance during use and/or that suits user need and/or preference.

FIG. 4 illustrates a side perspective view of one embodiment of the portable conveyor device 100 of the present invention in an operable position, and being used to load package 400 into a vehicle 200 from a dock 300 in accordance with the disclosed architecture. More specifically, ramp lip portion 176 extends to and rests on dock surface 302 to not only offer additional structural support to the outboard end of portable conveyor device 100, but to also allow for package 400 to be pushed smoothly by a user (not shown) from the dock 300 onto the conveyor belt 136 without having to physically lift the same and risk injury. In this particular configuration, the portable conveyor device 100 is also oriented in such a way that the conveyor belt assembly 130 is substantially parallel to the ground surface and in relatively the same horizontal plane as the dock surface 302 and the bed of the vehicle 200.

FIG. 5 illustrates a side perspective view of one embodiment of the portable conveyor device 100 of the present invention in a stowed position, and attached to a vehicle 200 in accordance with the disclosed architecture. More specifically, portable conveyor device 100 is removably attached to a vehicle tow-hitch 204 and is stored vertically for transport. In this particular orientation of the device 100, the first and second frame members 112, 114 have been configured in a substantially vertical orientation by manipulating and locking the pins 115 connecting the first frame member 112 to the second frame member 114, and the second frame member 114 to the trailer hitch connector 116. This orientation of the device 100 can be used to transport the device 100, or as a position to store the device 100 when not in use to minimize the stress on the portable conveyor device 100 associated with being in a cantilevered position, as is best shown in FIG. 4.

Notwithstanding any of the forgoing, it is also contemplated that the orientation of device 100 can be revised so that conveyor frame 120 and conveyor belt assembly 130 are capable of being inclined in a direction away from vehicle 200 to, for example, unload shingles from the vehicle 200 unto a roof or other elevated surface or location (not shown), but still function in essentially the same manner.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable conveyor belt device for use with a vehicle, the portable conveyor belt device comprising:
    a support frame configured for attachment to the vehicle;
    a conveyor frame comprising two parallel side frame members;
    a conveyor belt assembly;
    a hydraulic arm assembly;
    a ramp pivotally connected to the two parallel side frame members of the conveyer frame; and
    a remote control;
    wherein the conveyor frame is pivotally connected to the support frame and moveable relative to the support frame via the hydraulic arm assembly.

2. The portable conveyor belt device of claim 1, wherein the support frame is comprised of a first frame member, a second frame member and a hitch connector.

3. The portable conveyor belt device of claim 2, wherein the first frame member is pivotably connected to the second frame member, and the second frame member is pivotably connected to the hitch connector.

4. The portable conveyor belt device of claim 1 further comprising a motor.

5. The portable conveyor belt device of claim 1, wherein the conveyor belt assembly is comprised of a conveyor belt that is movable in a forward direction and a backward direction.

6. The portable conveyor belt device of claim 5, wherein the remote control controls at least one of the following: (a) a direction of travel of the conveyor belt; (b) a speed of travel of the conveyor belt; and (c) an angle of the conveyor belt assembly relative to a first frame member of the support frame.

7. The portable conveyor belt device of claim 1, wherein the conveyor belt assembly is repositionable between a parallel position and an angled position relative to a ground surface.

8. The portable conveyor belt device of claim 1, wherein the portable conveyor belt device is removably attachable to the vehicle.

9. The portable conveyor belt device of claim 1, wherein the ramp comprises a lip portion.

10. The portable conveyor belt device of claim 1, wherein the hydraulic arm assembly comprises a housing pivotably connected to the support frame and a hydraulic arm that is capable of extending from said housing and that is attached to the conveyor frame.

11. A portable conveyor belt device for use with a vehicle, the portable conveyor belt device comprising:
   a support frame configured for attachment to the vehicle;
   a conveyor frame comprising two parallel side frame members;
   a conveyor belt assembly;
   a motor;
   a hydraulic arm assembly;
   a ramp comprising a pair of spaced apart members pivotally connected to the two parallel side frame members of the conveyer frame; and
   a stand-alone remote control not attached to the portable conveyor belt device;
   wherein the conveyor frame is pivotally connected to the support frame and moveable relative to the support frame via the hydraulic arm assembly.

12. The portable conveyor belt device of claim 11, wherein the support frame is comprised of a first frame member, a second frame member and a hitch connector.

13. The portable conveyor belt device of claim 12, wherein the first frame member is pivotably connected to the second frame member, and the second frame member is pivotably connected to the hitch connector.

14. The portable conveyor belt device of claim 12, wherein the conveyor belt assembly is repositionable between a parallel position and an angled position relative to the first frame member.

15. The portable conveyor belt device of claim 11, wherein the conveyor belt assembly is comprised of a conveyor belt that is movable in a forward direction and a backward direction.

16. The portable conveyor belt device of claim 15, wherein the remote control controls at least one of the following: (a) a direction of travel of the conveyor belt; (b) a speed of travel of the conveyor belt; and (c) an angle of the conveyor belt assembly relative to a first frame member of the support frame.

17. The portable conveyor belt device of claim 11, wherein the ramp further comprises a lip portion.

18. The portable conveyor belt device of claim 11, wherein the hydraulic arm assembly comprises a housing pivotably connected to the support frame and a hydraulic arm that is capable of extending from said housing and that is attached to the conveyor frame.

19. A portable conveyor belt device for use with a vehicle, the portable conveyor belt device comprising:
   a support frame comprised of a plurality of pivotably connected support frame members;
   a conveyor frame comprised of two spaced apart and generally parallel side frame members, wherein said side frame members are connected to at least one cross member;
   a variable speed conveyor belt assembly attached to the conveyor frame and comprised of a pair of spaced apart and generally parallel rollers, and a conveyor belt;
   a hydraulic arm assembly;
   a motor for powering the conveyor belt and the hydraulic arm assembly; and
   a ramp comprising a pair of spaced apart members pivotally connected to the two spaced apart and generally parallel side frame members of the conveyer frame, a top plate aligned with a top surface of the conveyer belt, and a lip portion extending outwardly from the top plate in a direction away from the portable conveyor belt device;
   wherein the conveyor frame is pivotally connected to the support frame and moveable relative to the support frame via the hydraulic arm assembly.

* * * * *